(12) United States Patent
Stegmann et al.

(10) Patent No.: US 6,415,050 B1
(45) Date of Patent: Jul. 2, 2002

(54) METHOD FOR DISPLAYING AN OBJECT DESIGN

(76) Inventors: Christian Stegmann, Bacherner Weg 12, 82266 Inning; Julian Eggert, Ligusterstr. 7, 80939 Munich, both of (DE)

( * ) Notice: Subject to any disclaimer, the term of this patent is extended or adjusted under 35 U.S.C. 154(b) by 0 days.

(21) Appl. No.: 09/242,872
(22) PCT Filed: Sep. 2, 1997
(86) PCT No.: PCT/IB97/01048
§ 371 (c)(1),
(2), (4) Date: Feb. 25, 1999
(87) PCT Pub. No.: WO98/10379
PCT Pub. Date: Mar. 12, 1998

Related U.S. Application Data (60) Provisional application No. 60/025,334, filed on Sep. 3, 1996.

(51) Int. Cl.[7] .................................................. G06K 9/00
(52) U.S. Cl. ........................................ 382/154; 382/285
(58) Field of Search ................................. 382/154, 285, 382/106; 345/423, 468, 471, 420, 630, 424, 419; 356/623

(56) References Cited

U.S. PATENT DOCUMENTS

| | | | | |
|---|---|---|---|---|
| 5,448,687 A | * | 9/1995 | Hoogerhyde et al. | 345/423 |
| 5,616,294 A | * | 4/1997 | Deckard | 264/413 |
| 5,645,740 A | * | 7/1997 | Naiman et al. | 219/121.61 |
| 6,141,105 A | * | 10/2000 | Yahashi et al. | 356/623 |

* cited by examiner

Primary Examiner—Andrew W. Johns
Assistant Examiner—Seyed Azarian
(74) Attorney, Agent, or Firm—Howard & Howard (57) ABSTRACT

The disclosure presents methods to enable and facilitate the display, visualization and realization of a two-dimensional design on a three-dimensional object. Methods for the creation of the design using a Virtual Design Environment, alone or in conjunction with an Optical Projection System, for the application of the design onto a three-dimensional real world object, are proposed, and improvements to a Laser System for displaying the design on the object.

10 Claims, 5 Drawing Sheets

METHOD FOR DISPLAYING AN OBJECT DESIGN

This application claims the benefit of provisional application 60/025,334 filed Sep. 3, 1996.

This invention relates to a Virtual Design System that uses a mathematical 3D model of a real world object, performs an application of a design on that model, and which can be combined with an Optical Projection System to visualize the design and/or design data on the real world object.

Standard 3D-CAD (Computer Aided Design) systems are at present widely used or the realization and visualization of designs on objects. This includes the representation of an object from different perspectives, change of light sources, shadowing, rendering, animation, and related features. These standard systems represent a real world object internally as a mathematical model, which incorporates the three-dimensional data of the object in form of primitives such as lines, polygons and solid bodies, and an instruction set of the operations which can be performed to manipulate the data. Application of designs on 3D objects with help of these systems is done in the form of rendering techniques. Bitmap patterns are projected on the 3D-object for visualization purposes only, this is called texture mapping. For example, a fashion design is evaluated visually by trying out different textures and color combinations on different parts of the design.

With the presently available methods, there are three main difficulties:

1. Usually, the design is done in a pure 2D environment. The consequence is that inconsistencies, such as unexpected perspective views and genera unaesthetic effects, do not appear until the design has been applied to a real 3D object Such late findings can be very costly.
2. The application of a design onto a real 3D object is a tedious, messy, error-prone, unreproducable and time-consuming process. The decoration lines, masks and templates are positioned either in a complicated manual process, or with large inaccuracies due to individual differences in aesthetic perceptions.
3. The application of designs on virtual 3D objects using CAD software with texture mapping techniques provides a visualization of the designed 3D object, but does not provide accurate data for the application of the design on the real world object. The consequences are then as in point 2.

The present method is intended to give an artist or designer the possibility of applying designs onto 3D objects imported from CAD systems in form of surface or solid models and generate data that will be shared by production (meaning here the actual application of the 3D design onto the real object by means of an Optical Projection System, such work being for example: the application of templates. bands, ribbons and other decorating aid that is applied prior to painting or decorating an object, or simply the visualization of the design outline on the real object), engineering (providing the possibility to give instant feedback to the providers of the CAD model or the technical designers) and marketing or sales (for example for the presentation of a decorated CAD model to a customer, or for the generation of a computer animation). The subject matters of the document U.S. Pat. No. 5,490,080 are a method and a device for decorating a tridimensional object wherein a computer visualizes in advance the expected result. This method has the disadvantage that applications of designs on non-flat surfaces often lead to unacceptable distortions of the designs. Such findings often occur at a late stage when the real object has already been decorated, leading to costly re-work or even redesigning from scratch.

Contrary to traditional methods, in the present patent application, the complete design process occurs in a 3D Virtual Design Environment using a special 3D-CAD system. The production of a 3D decoration can then be tested virtually, avoiding inconsistencies and errors. And contrary to some previous design processes that use the 3D capabilities of computers, not only the visualization data, but also the exact data of the design applied onto the 3D object is used for the design process. The exact 3D data of the design work is used subsequently by an optical projection system. In the present patent application, the optical projection is done with a Laser Projection System or other Optical Projection Systems. An improved Laser Projection System is presented, previous proposals of such systems are described in US. Pat. Nos. 5,341,183, or 5,388,318. The Optical Projection System allows the visualization, now on the real world object, of the results obtained by the virtual design application using the CAD system. Further on, in the present invention, additional data gained from the 3D-CAD system during the design process can be used in manufacturing. measurement and alignment processes. As an example, object details and material characteristics can be incorporated More specifically, the object of the present invention is to allow rapid correction of errors such as unwanted geometric distortions and to avoid projection occlusions.

This object is solved by a method of generating a design according to claim 1.

Further embodiments are disclosed in the subclaims. into the computer aided design process, imposing constraints on the design and assisting the designer during the application of the design on the real world object (e.g. constraints on the design due to the position of doors, windows, pilots, antennas, etc. on the real object).

Note regarding nomenclature:

The term projection is used here for two different situations:
A) When denoting the 2D to 3D projection done by the artist when designing using the Virtual Design Environment of the computer.
B) When denoting the process of the physical projection e.g. of the optical light beam (laser or other) onto the real 3D object, using the Optical Projection System.

Similarly, the term 3D object is referred to in two different situations:
A) When denoting the virtual, or 3D-CAD object
B) When denoting the real, physical object One embodiment of the method consists of the following steps:

If a 3D CAD model exists:

The designer initially starts with a two dimensional image of the design which he wants to apply on an object. This 2D design is incorporated into a CAD system which possesses an internal 3D model of the mentioned object. The 2D draft is then projected onto the 3D model by using one of several methods available, in order to be able to visualize the decorated 3D model of the 3D object. This provides a possibility to evaluate the decorated 3D model before applying the design on a real world object. The virtual design environment allows for an overall improved design production. The reasons for the improvements are manifold. Applications of designs on non-flat surfaces often lead to unacceptable distortions of the design. Such findings often occur at a late stage when the real object has already been decorated, leading to costly re-work or even redesigning from scratch. In this method, the visualization of the 3D object with the incorporated design allows a better evaluation of the design at an early stage, and changes can be made as often as required at no extra cost. If the result is not satisfactory, the 3D decoration is redone by modifying the 2D decoration with subsequent repetition of the 2D onto 3D projection step. This loop is repeated until the result fulfills the requirements, such as, for example, that an insignia must be clearly discernible from certain viewing angles, or simply, that the design fulfills proposed aesthetical considerations.

Once approved, the decorated 3D model of the Virtual Design Environment becomes the new centerpiece of object definition from which:

A) Engineering can receive feedback and incorporate the decorated object back into engineering's database. If necessary, they can modify the original 3D object using motivations provided by the virtual design application.

B) Production or manufacturing will be able to apply the exact decorations and other design data onto the real 3D object by using an Optical Projection System in conjunction with the data generated by the Virtual Design Environment with 100% repeatability.

C) Marketing/sales will be able to generate replica-exact computer-animations and presentations of the decorated 3D object, again using the data generated by the design environment.

The task of applying the decoration onto the real world object is done with the assistance of Optical Projection Systems, such as a 3D-Laser projector, as described below.

If a 3D-CAD model (either without design or with the design incorporated) does not exist:

The following cases are covered by using a special teaching (or digitizing function available for the vector scanning Laser system (prior art):

A) The 2D design is realized and applied to the object in the traditional way, (i.e. using templates, measuring aid, etc.) and after the 3D real object has been decorated, a two-projector Laser system is used to digitize (or teach-in) the approved design, e.g. using a known method of triangulation, thus providing data for reproducible subsequent object decorations.

B) The 3D decorated object already exists and the same design has to be reproduced on other objects, but no 3D CAD data of the object exists. Then again, a two-projector Laser system can be used as in A).

C) The 3D decorated object exists, for which a 3D CAD model exists, but no 3D decorated CAD model exists. In this case the two-projector Laser system is used to incorporate the design data and make it available for the computer. Then, the incorporated design data can be manipulated and modified in the virtual environment as described previously. Afterwards. the design can be applied again onto real objects.

The decorative 3D design done on a virtual 3D object using the Virtual Design Environment generates the data fed to the Laser System that will project the outlines (the line-artwork) accurately onto the real 3D object, in a fashion similar to Laser shows used for entertainment. The main difference to Laser shows is that with the present method, the laser projection is accurate on a 3D object, regardless of the relative position of the laser system. The Virtual Design Environment generates exact data of the design in real 3D coordinates. Typical accuracies are in the range of a couple of millimeters over object sizes of 20 m, or half a centimeter over 50 m objects.

For the projection of the 3D-design data onto the real world object prior art Laser Systems can be utilized. Additionally, a Laser System with a number of improvements can be utilized. The improvements are presented in this patent application. The features of the improved Laser System include:

1) Linewidth-control: a built-in device can dynamically vary the focussing. This feature can be used when projecting (scanning) over varying angles of incidence onto the surface or over varying distances to the object. In the first case, the change of the Laser beam spot size as a function of angle of incidence can be influenced to a certain decree, in the second case, the focussing is changed so as to guarantee a constant spot size over varying distances to the object within a scanned contour line. Contrary to prior art Laser Projection Systems available for the type of tasks we propose. linewidth control as a function of object properties is possible due to the information available from the Virtual Design Environment.

2) Laser class 3A: The software computes the distance to the object, and automatically modulates the Laser power in such a way that, in combination with the prior-art modulation as a function of scanning speed, a modulation as a function of the distance to the object is done, considering the change in beam diameter and the change in scanning speed as a function of the distance. Again, modulation of the Laser power as a function of the object distance properties is only possible due to the information available from the Virtual Design Environment.

3) Manual calibrations: for applications where a high accuracy is not required, or where periodic visual checking of reference points is enough, e.g., for positioning of templates, a lower cost Laser system can be used. Such a lower cost Laser system uses the same 3D projection software as the prior art Laser system, but there are no detectors or retroreflectors or detection circuits for the Laser calibration present; instead, the calibration points are targeted individually and manually using a trackball, mouse or joystick, and checked visually for accuracy. In this way, no detection circuitry is needed any more. (Prior art Laser systems use opto-electronic detection of points of reference which are used for calibration of the Laser systems to calculate their positioning relative to the 3D object. These reference points are attached to known positions on the 3D object.)

BRIEF DESCRIPTION OF THE DRAWINGS

FIG. 7b shows the final portion of a flow chart shown in FIG. 7a.

DETAILED DESCRIPTION OF THE PREFERRED EMBODIMENT

The design process starts with a two dimensional image of the design that has to be visualized and/or applied on a real world object. The referred design is entered into a CAD-system directly exploiting the capabilities of standard 2D-CAD software packages. Alternatively, if an already drawn design has to be processed, it can be entered into the CAD system by using a digitizing tablet, a scanner, or similar means to incorporate design data. The internal representation of the design data uses mathematical 2D-primitives including lines, polylines, polygons, etc., with attributes such as color, texture and material properties. The 2D-data of the design is then passed to a Virtual Design 3D-CAD system with special features for the design process.

The 3D-CAD system possesses an internal 3D model of the real world object onto which the design will be applied. The data for the 3D-CAD model is normally available from the engineering/architecture-design divisions of the company that produces,builds the real world object or is commercially available. In case that the 3D-CAD model is not directly available, there is the possibility to incorporate this data with the help of 3D laser scanning systems or by other means. The internal representation of the 3D-CAD model is described by 3D primitives such as planes. surface elements, rotational, translational and extrusion 3D-objects, and 3D solid bodies. In the following, we describe methods to realize the application of the 2D design data onto the 3D-CAD model in the virtual design environment.

Figure 1:
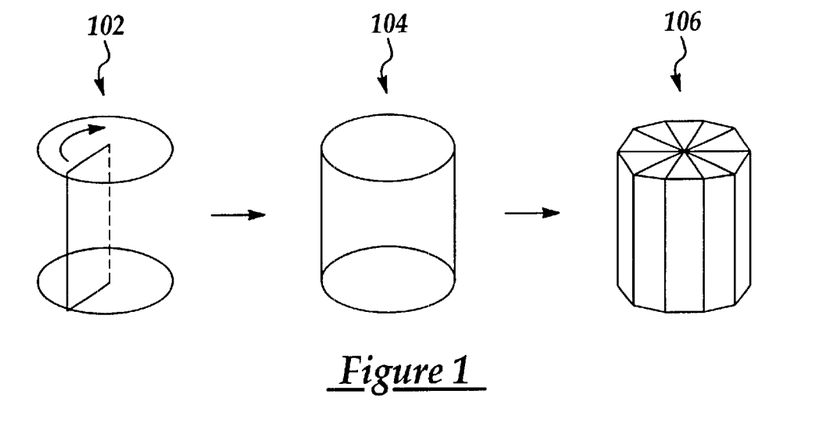
FIG. 1 shows the creation of a 3D object using mathematical descriptions and its tessellation into coplanar polygons as it is needed for the 2D onto 3D projection procedures.

With specific reference to FIG. 1, in the first portion 102, a command to create a three-dimensional rotation object (cylinder) by indication of the outline, the rotation axis and the rotational angle is illustrated. In the second portion 104, an internal representation of the cylinder with closed top and bottom surfaces is shown. In the third portion 106, decomposition of the cylinder surface into basic coplanar polygons (tessellation) is illustrated.

Figure 2A:
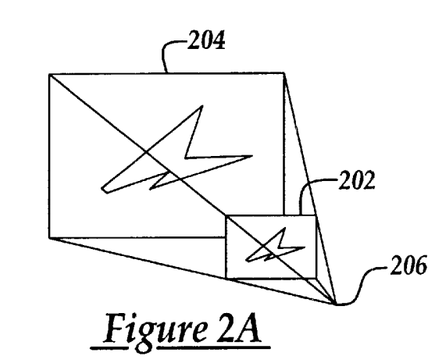
FIGS. 2A–2C show the projection of a 2D design onto a 3D object using three different types of projection procedures.
Figure 2B:
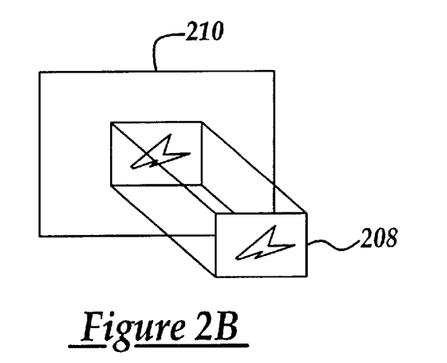
Figure 2C:
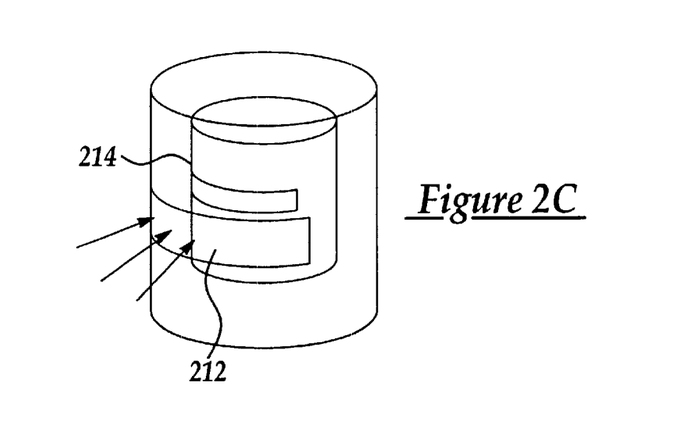

The 2D-CAD design is then projected onto the 3D-CAD model of the real world object. Difference projection methods can be used, according to the design purpose, e.g., a central, a parallel or a cylindrical projection, see FIGS. 2A, 2B, and 2C. For example, if the design has to be clearly visible and detectable from a certain fixed viewpoint, a central projection method will be used. In this case, the viewpoint for optimal visualization falls together with the vertex of the projection pyramid, the project center. A parallel projection method will be used for an approximately cylindrical or barrel-like object onto which a surrounding design has to be applied. Additionally, real world optical projections can be simulated with the Virtual Design Environment. With specific reference to FIG. 2A, an illustration of a central projection is shown in which a projection of a two dimensional (2D) design 202 is projected onto an idealized flat surface 204 of a three dimensional (3D) object. The projection vectors originate at a projection center 206. With specific reference to FIG. 2B, an illustration of a parallel projection is shown in which a projection of a two dimensional (2D) design 208 is projected onto an idealized flat surface 210 of a 3D object. The projection vectors are orthogonal to the surface with the 2D design. With specific reference to FIG. 2C, an illustration of a cylindrical projection is shown in which a 2D design 212 is projected onto a surface 214 of a 3D object. The projection vectors are orthogonal to an outer cylindrical surface with the 2D design 212.

The first virtual projection method uses both an image representation and a 2D-CAD representation of the 2D-design. While the image representation contains only texture information coded as pixel color values, the 2D-CAD representation contains the vectorial information about the contour lines of the 2D-design. To get the data of the 2D-CAD design projected onto the 3D-CAD model, the former is discretized (split into short straight line segments) and the latter is tesselated (split into basic, small coplanar polygons). The intersection of the projection of each 2D-design contour segment with each 3D-polygon is then calculated. This results in a subdivision of each 2D-design contour segment. The parts of the contour segment that intersect with the 3D-polygon compose the vector data of the 2D onto 3D design projection (see FIG. 3 for further explanations). It is used later for the Laser Projection System and for the application of the design onto the real world object. A similar procedure has to be applied for a realistic visualization of the design projected onto the 3D-model. A backprojection of each 3D-polygon onto the image design plane determines the area of the image that corresponds to that polygon. This calculated part of the image is then mapped onto the 3D-polygon as a texture. Repeating the backprojection step for all 3D-polygons creates a 3D-model with the 2D-design image projected onto it. This can be used for visualization purposes. It is important to notice that the same projection parameters have to be used both for the calculation of the 2D-design projection data and for the texturing procedure of the 3D-polygons with the 2D-design image. Moreover, the 2D-CAD representation of the 2D-design has to coincide exactly with the 2D-design image representation.

Figure 3:
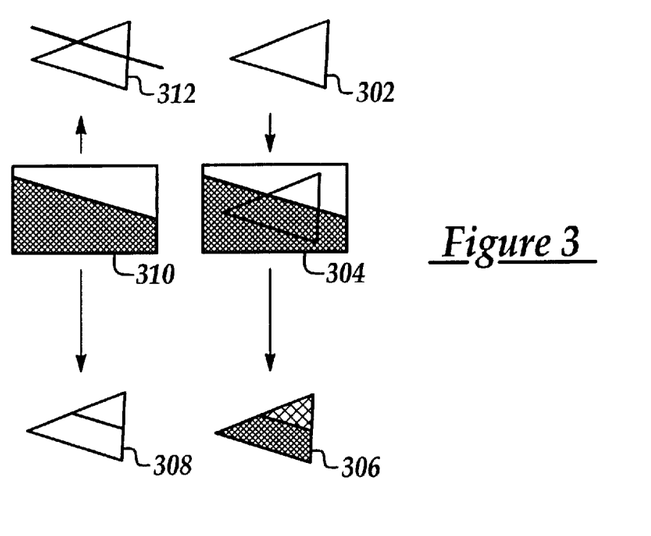
FIG. 3 shows in detail a procedure to perform the 2D onto 3D projection using a computer and which allows to gain both the visualization data of the 3D object with the 2D design incorporated and the 3D data of the design on the 3D object, needed in posterior steps for the projection of the design on the real world object.

With specific reference to FIG. 3, illustration 302 shows the backprojection of a 3D model element onto the 2D design image. Illustration 304 shows 2D design image information, symbolized by differently shaded regions. Illustration 306 illustrates a 3D element (triangle) with texture added from the 2D design image. The texturized 3D elements are used for the realistic visualization of the 3D-model with the 2D design image projected into it. Illustration 308 shows the 3D design element with 3D contour data projected onto the 3D design element (i.e., the 3D design segment, thick line). The data of the 3D design segment is used for the Laser Projection System. Illustration 310 shows the 2D design data in vector form (thick black line). Illustrations 304 and 310 show the exact correspondence of the 2D design vector data with the 2D design image data. Illustration 312 shows the projection of the 2D design data onto the 3D model element.

Figure 4:
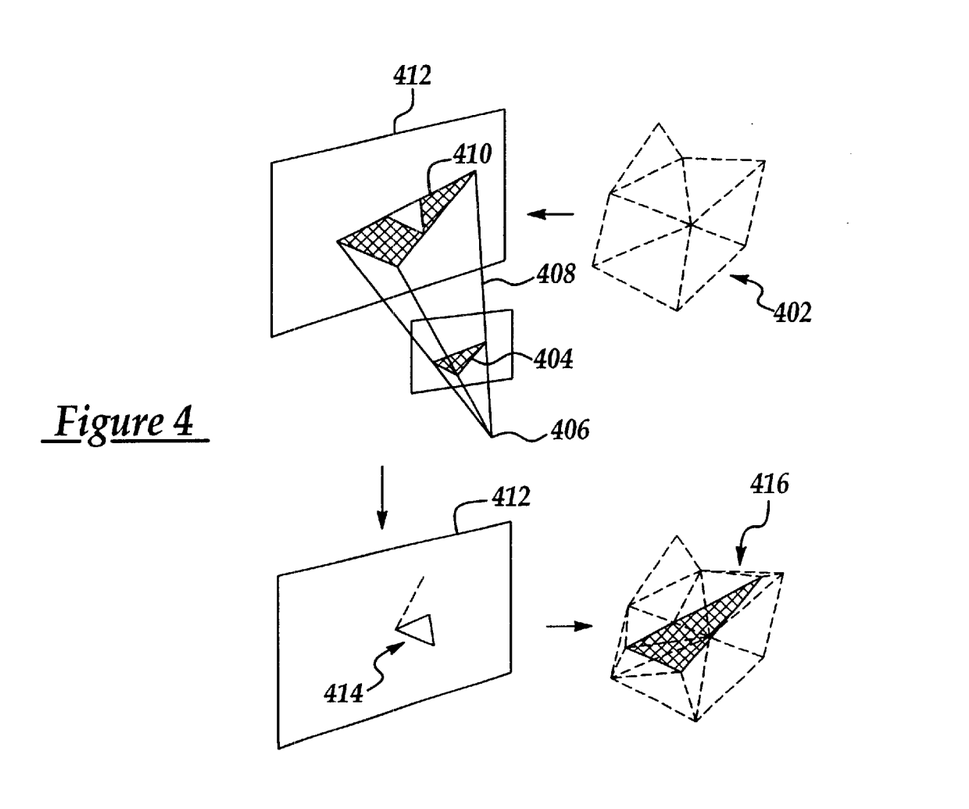
FIGS. 4–6 show alternative procedures to gain both the visualization data of the decorated 3D object and the 3D data of the design on the 3D object as in FIG. 3.

In the second method, the 2D-CAD design data consists of filled polygons. The form of the polygons is defined by the 2D-coordinates of their vertices. Additionally to the polygon borderlines, the 2D-design primitives have design data incorporated, which are used in the computer aided visualization of the 2D-design projected onto the 3D-object. This data consists of the colors, textures and other properties of the borderlines and internal regions of the filled polygons. To visualize the 2D-CAD design projected onto the 3D-CAD model, both have to be tesselated (split into basic, coplanar polygons). For the calculation of the 3D-coordinates of the design outline on the 3D-CAD model, the polygon borders that correspond to the original design outline are marked. Then, the intersection of the projection of each 2D-CAD element with each 3D-CAD element is calculated. This is illustrated in FIG. 4 for the case of a central projection, in which we have a projection cone that separates the 3D-CAD element into two regions; one lying inside of the projection cone and one lying outside. The original 3D-CAD element is split into new elements, and each new element lying inside of the projection cone corresponds to the projection of the 2D-CAD element onto the 3D-CAD model. The color, texture and material information from the 2D-CAD element is assigned to this new 3D-CAD element for later visualization purposes. Additionally, the previously marked polygon borders delimiting the 2D-design outline are used to transfer this information to the new 3D-CAD elements. This information is used later in the design application process. These steps are repeated for all elements of the 3D-CAD model and the 2D-CAD design. As a result, this creates a 3D-CAD model with the design data incorporated.

As a third method, standard commercially available CAD software packages can be used (E.g. AutoCad V.12.0 or higher+AutoSurf, from AutoDesk, or Microstation V. 6.0 or higher, from Bentley Systems). In this case, the 2D-design data has to be composed of closed contour lines or curves in 3D space. The contour lines or curves are normally gained defining a number of control points and a mathematical curve definition. The closed contours can be projected onto a 3D-surface, cutting a hole with a borderline corresponding to the projection of the 2D-design polygon contour. Similarly, the intersection of the projection cone with the 3D-surface can be computed, resulting in a 3D-surface part corresponding to the hole that was cut in the step before. Combining spatially the two parts, one with the projection of the design outline cut into its surface and its complement, results in 2 elements that again represent the original 3D-surface. But now, each of the two elements can be assigned its own design attributes (color, texture, material properties, etc.), enabling the CAD-system to visualize the 3D-object with the design incorporated. Because of the two different CAD elements, the coordinates of the design projection can also be regained in this way, enabling the use of the design projection data with a posterior Laser projection system or for other purposes. The method is explained in FIG. 5.

Figure 5:
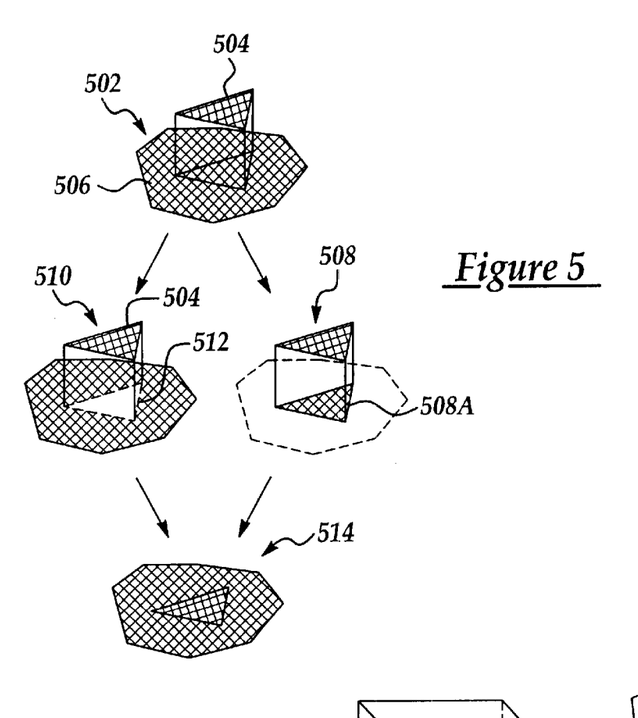

With specific reference to FIG. 5, illustration 502 shows the parallel projection of a 2D design outline 504 onto a 3D object surface 506. Illustration 508 shows a complementary element 508A gained by computation of the intersection of the projection trapezoid with the 3D object surface 506. Illustration 510 shows a hole 512 cut by the projection of the 2D-design outline 504. Illustration 514 shows the spatial recombination of the two parts (illustrations 508, 510) incorporation the projected 2D outline and the 2D design data.

Figure 6:
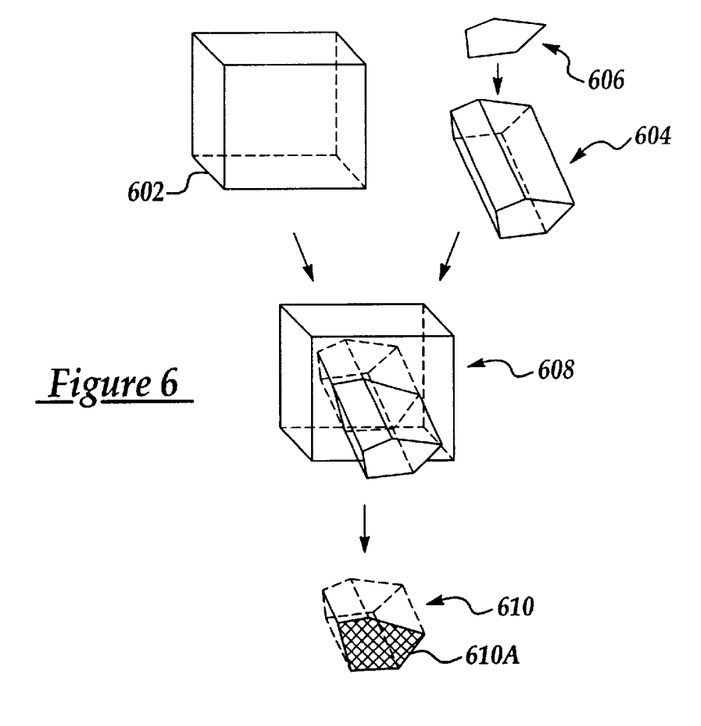

The last method consists in using solid modeling techniques available in standard 3D-CAD packages. In this case, the 3D-model has to be composed using primitive solid bodies such as spheres, cubes or alternatively bodies defined by the rotation or the translation of a basis line (there are other alternatives, the examples are not meant to be complete). The 3D model can be composed by applying boolean operations (e.g. union or difference) on several primitive solid bodies. The closed lines of the 2D-design data are also converted into solid bodies by projection or extrusion of the original contour. This is shown in FIG. 6 for a closed design polyline with five points. In this particular example a solid body for the design polyline is gained by placing the polyline in 3D-space and by projecting parallel lines from all polyline vertices. This results in a solid body constructed by extrusion that can be used for further operations. An intersection or difference operation between the 3D-model and the solid body that is gained from the 2D-design results in a 3D-body from which the 3D-data of the 2D-design onto 3D-model projection can be extracted. This is sketched in FIG. 6. The shaded face is the surface that corresponds to the projection of the 2D-curve onto the 3D-model surface. The borderline of the shaded face is the data that is used for the posterior application of the design on the real world object.

With specific reference to FIG. 6, a 3D model 602 is composed of solid volumetric 3D object (shown in the example as a cube). A solid object 604 is generated by a translation of a 2D design contour 606 along a pathway in 3D. In illustration 608, both solids are properly located according to the 2D onto 3D projection specifications. In illustration 610, an intersection operation of applied to the two solids. The shade face 610A corresponds to the intersection of the surfaces. The thick line corresponds to the 2D design contour projected onto the 3D-model. That data of the thick line is extracted for the Laser Projection System.

The next step that follows the calculation of the projection data of the 2D-design onto the 3D-object is the visualization of the 3D-CAD model with the 2D-design projected onto it. Here, traditional visualization techniques apply. As each of the new calculated elements from the 3D-CAD model has the correct design properties assigned to it (e.g. color, texture, etc., of its borderline and its interior), this data can be used by a standard visualization algorithm. This creates a full perspective 3-dimensional view of the 3D-CAD model decorated with the 2D-CAD design. It can be evaluated from different viewpoints and under different light conditions. Additionally, the new 3D-model can be used for further visualizations, such as animations and presentations.

From the 3D-visualization, it is easy to evaluate if the design fulfills all necessary requirements. If this is not the case, the projection step of the 2D-CAD design onto the 3D-CAD model is repeated. The evaluation comprises for example examinations of design visibility from different viewpoints, and aesthetical considerations such as the distortion of the design caused by the projection on an irregular surface. Another important fact is that technical details of the 3D-objects can be taken into account at this step. For example, it can be the case that the design borderlines should avoid some areas of the objects surface, and this can be easily verified at this step.

For the application of the design onto a real world object, the 3D-data from the projected design elements is extracted. This is done either by using the 3D-coordinates of the projected design element segments in case of the first projection calculation method or by evaluating the 3D-coordinates of the borderlines of the 3D-elements that correspond to the borderlines of the 2D-design. These specific borderlines were marked before during the 2D to 3D projection step for the second, third and fourth projection calculation methods or they were explicitly calculated for the first calculation method, see the explanations of the virtual projection methods of the previous pages. The data gained from this step contains 3D-lines and 3D polylines (consecutive connected lines defined by a list of points.). At this point, the data can be optimized for the design application. This will include for example an improved ordering of the sequence of output 3D-lines which takes into account the technical characteristics of the projection system (e.g. for the maximization of the projection speed). Another example is the optimization of the setup locations of the one or more projection systems relative to the real object considering angles of incidence and occlusion (shadow) effects. The gained data is then exported to and read by a projection system coupled with the computer.

In this invention, a Laser Projection System is used for this purpose. The system reads the data from the 2D to 3D projection step and uses this data to project the outlines of the design on the real, physical object. For this purpose, the data coordinates are transformed into the projection angles for the Laser Projection System (vector-scanning Laser System). To be able to do this, reference points are introduced for the calibration of the Laser System. The reference points are located at the same position (in object-centered coordinates) on the surface of the 3D-CAD model and the real world object. The 3D-coordinates of the reference points in the 3D-CAD model are passed to the projection system together with the design outline data. According to standard techniques (prior art) this enables the Laser Projection System to determine its position relative to the real world object and thus an accurate projection of the design outline on mentioned object.

Alternatively, other optical projection methods can be used. These include raster-scanning Laser Systems, as are used for Laser-TV technologies, or simple optical projectors of any kind that display the data gained from the 2D to 3D projection step on the real object. In the case of raster-type light projection systems, the Virtual Design Computer System can be used to generate mathematical envelope functions that will distort the raster-scanned projection image in a way that when the projected image hits the object surface, it will do so in a predicted way and as a result give a proper intended image, free of unwanted distortions, such as was verified during the virtual projection step.

Figure 7A:
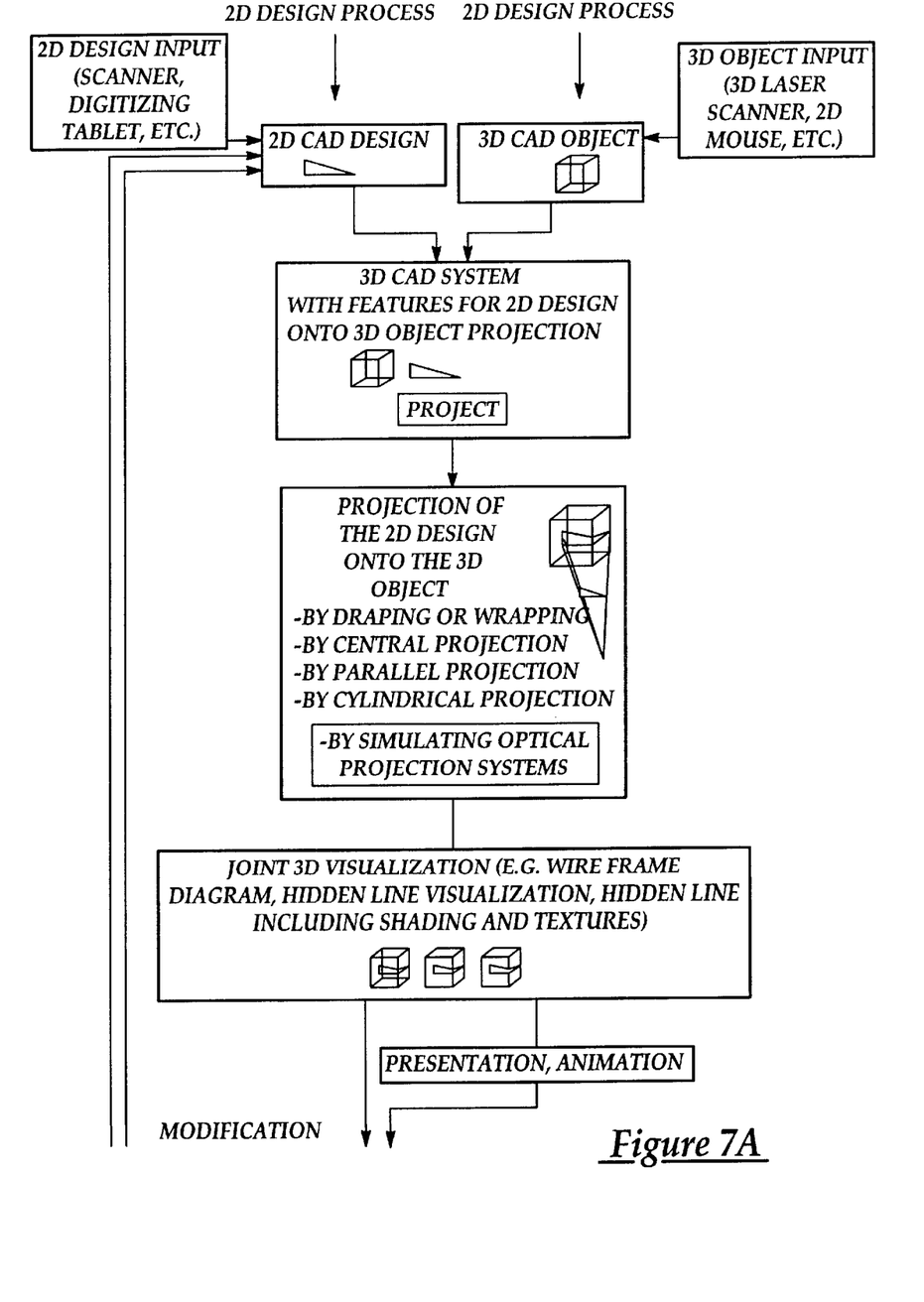
FIG. 7a shows a portion of a flow chart for the inventive method.
Figure 7B:
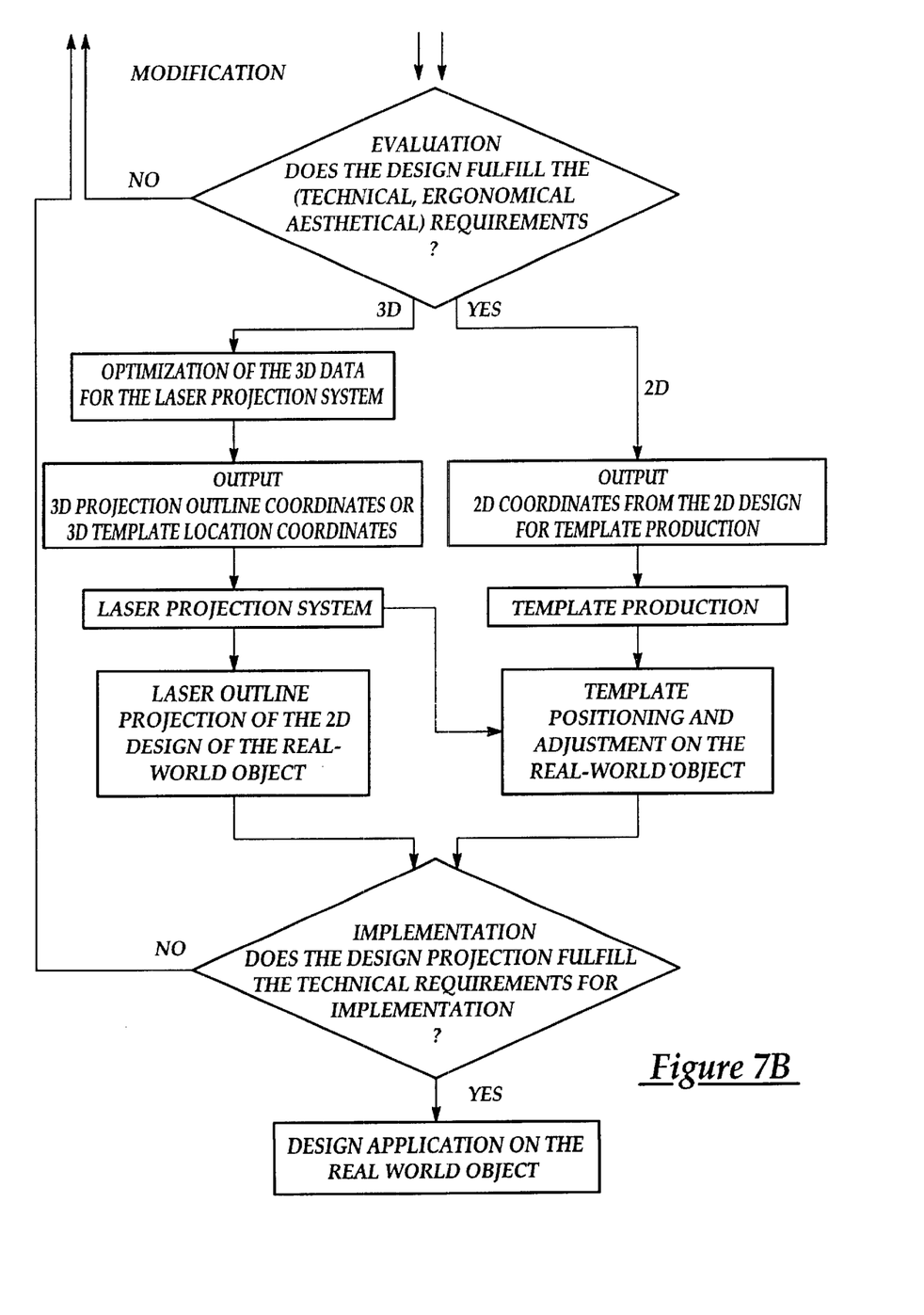

The interaction of the Virtual Design Computer System with the Laser Projection System provides many benefits. First, the outcome of the design process can be rapidly visualized, evaluated and modified, and thus allows for rapid correction of errors such as unwanted geometric distortions. Second, the CAD-system can calculate the optimal placing for the Laser Projection system, e.g. avoiding projection occlusions or under the condition that the angle of incidence of the Laser beam onto the object surface should always be as close as possible to 90°. Third, a system with several simultaneously working Laser projectors can be built, and the projection data for each system will be calculated by the CAD-system. This enables a substantial improvement of the design process, because the design can be applied on different parts of the objects simultaneously. In this invention, the design step and the physical projection/design application step are coupled, so that one can benefit from the data obtained by the other. There is thus a direct feedback from design to realization, avoiding erroneous and therefore expensive steps. FIGS. 7a and 7b present a flow diagram of the work steps of the Virtual Design Environment coupled with a Laser Projection System as proposed in this invention.

Additionally, data other than simple visualization contours can be projected onto the real-world object. This data can originate from the 2D-design of the 3D-model information acquired by the computer system. It can provide information that accelerates or directs the design application process. In a projector system without a virtual design environment, the data of the 3D-model is not accessible and thus cannot be incorporated in the same way.

The projection of the design data gained in the Virtual Design Environment is done using optical projection systems. In this section we describe improvements on prior art Laser Projection Systems which can be used to project the design data created according to the preceding section onto a real world object. The use of a Virtual Design Environment allows the system to incorporate and use information into the optical projectomata creation process that was not available before, such as the properties of the 3D-object.

1) Linewidth-control

The Laser can be equipped with a built-in device that can dynamically vary the focussing. This feature can be used when projecting (scanning) over varying angles of incidence onto the surface or over varying distances to the object. In the First case. the change of spot size as a function of angle of incidence can be influenced to a certain degree; in the second case. the focussing is changed so as to guarantee a constant spot size over varying distances to the object within a scanned contour line.

The device used to achieve this consists of a lens that is moved back and forth along the optical axis using either a stepper motor, a galvanometer. actuator, or any other mechanism to change the focussing of a Laser beam in a digitally controlled way. The software computes the distance to the object, calculates the necessary aperture size to achieve the pre-defined spot size based on the Rayleigh range formula of focussing for Gaussian beams, assuming a Gaussian beam, and, based on the optical path parameters, adjusts the dynamic focus so as to achieve the required spot size. The basic formula governing the dependence of the Laser linewidth on the distance is: $w_o = f \lambda / \pi w_s$ where $w_o$ is the beam waist spot radius for a gaussian beam focussed by a lens or a mirror with focal length f, for $f >> W_s$, and where ws is the spot size at the lens or mirror and $\lambda$ the Laser wavelength (Source: Laser Spectroscopy, W. Demtröder, Springer-Verlag). If, in addition, the angle of incidence of the Laser beam onto the surface is known, the software computes the same necessary dynamic focus position in order to achieve the required spot size, or the best possible spot size achievable assuming an elliptical deformation of the spot on the surface. (e.g. if the angle of incidence is $\theta$, then the linewidth s on the surface at that point is $s = s_o / \cos(\theta)$, where $s_o = 2 w_o$ and $w_o$ is given above.) The incorporation of the Laser linewidth control is made possible by using the data of the virtual design environment and thus can not be realized in prior art Laser projection processes. For example, the projector location data and the 3D-model data incorporated into the virtual design environment is necessary to calculate angles of incidence and similar data relevant for the described linewidth modulation. Prior art systems used this dynamic focussing to achieve a constant-size spot on flat surfaces, but not on 3D contoured surfaces.

2) Laser Class 3A

For eye-safe 3D laser scanning, the software computes the distance to the object, and automatically modulates the Laser power in such a way that, in combination with the prior-art modulation as a function of scanning speed, a modulation as a function of the distance to the object is done, considering the change in beam diameter and the change in scanning speed as a function of the distance. Using the formulas valid for rapidly scanned beams given in the CDRH Laser safety booklet, and the fact that the dwell time of the Laser on the eye is inversely proportional to the scanning speed, which in turn is directly proportional to the angular scan speed and to the distance to the object, as well as a function of the beam diameter at that distance and whether the beam diameter is smaller or larger than the eye pupil (6 mm), and using the linewidth calculation as a function of distance to the object from above, the Laser power can be modulated in real time so that the Laser intensity stays always below the upper limit of Class 3A. (Source: American National Standard for Safe Use of Lasers, ANSI Z136.1–1993, pg. 85, B4.6: Scanning Lasers, and European Standard EN60825, pg.29, section 13.3, and page 45, main section C. Again, this improvement of the Laser projection system is made possible by the data of the virtual design environment, because it relies on the 3D-model object properties.

3) Manual Calibrations

The prior art vector-scanning laser projection systems need calibration points on the real 3D object to ensure an accurate projection. Additionally, as the hardware is subject to drift of its electronic components, they need to be periodically calibrated. Prior art systems use sensors or retro-reflective targets placed as reference points, and use detection circuitry to get position feedback when the Laser is scanning the reference points. The proposed low cost improvement avoids the detection circuitry for the reference points. For applications where a high accuracy is not required, or where periodic visual checking of reference points is enough, i.e., for positioning of templates, a low cost Laser system can be used. It uses the same 3D projection software to project points and lines as prior art Laser systems, but there are no detectors or retroreflectors or detection circuits present; instead, the calibration points, which can be simple visible elements such as bolts or rivets, are targeted individually and manually by a trackball, mouse or joystick, and checked visually for accuracy. In this way, no detection circuitry is needed any more, although calibration proceeds as in the prior art, using the angle coordinates of the reference points determined by the operator. A coarse and a fine tune control can be included to allow more user comfort.

What is claimed is:

1. A method of generating a design comprising:
   providing a computer system with three dimensional capabilities;
   providing a three-dimensional model of a real world object to the computer system;
   providing a two-dimensional design which is to be placed on the three dimensional object;
   associating the two-dimensional design with the three-dimensional model in the computer;
   providing the possibiliy for the operator to evaluate the two-dimensional design associated with the three-dimensional model;
   creating three-dimensional data of the two-dimensional design associated with the three-dimensional model;
   calculating the optimal placing for an optical projection system with three-dimensional capabilities with respect to the real object by means of the computer system; and
   applying the three-dimensional data of the two-dimensional design associated with the three-dimensional model by means of the optical projection system on the real world object.

2. A method as recited in claim 1, further comprising the step of providing the possibility for the operator to evaluate and modify the image of the two-dimensional design as projected by the optical projection system.

3. A method as recited in claim 1, wherein the three-dimensional model of the real world object in the computer is provided by digitizing the design on the surface of the actual three-dimensional object by utilizing a laser.

4. A method as recited in claim 1, wherein the optical projection system has several simultaneously working projectors.

5. A method as recited in claim 1, wherein the optical projection system is a Laser Projection system.

6. A method as recited in claim 5, wherein the step of applying the three-dimensional data comprises the steps of:
   monitoring the relative position of a laser source of the Laser Projection system and an object surface; and
   moving a lens along an optical axis to control the width of the laser beam directed onto the object in response to the monitored relative position, and to achieve a desired beam width.

7. A method as recited in claim 6, wherein the monitored relative position is the distance between the laser source and the object surface.

8. The method as recited in claim 6, wherein the monitored relative position is the angle of incidence between the laser source and the object surface.

9. A method as recited in claim 6, wherein the step of applying the three-dimensional data comprises prior to the step of monitoring the relative position the steps of:
   guiding visually the laser beam to specified calibration points on the object; and
   incorporating the calibration data once the laser beam is close enough to the calibration points for manually calibrating the laser system with three-dimensional capabilities.

10. A method as recited in claim 6, wherein the step of applying the three-dimensional data further comprises the step of controlling the laser output as a function of the monitored relative position so that the Laser intensity stays always below the upper limit specified in the laser safety classification.

* * * * *